United States Patent [19]

Pullukat et al.

[11] 4,173,548
[45] Nov. 6, 1979

[54] ETHYLENE POLYMERIZATION CATALYST AND METHOD

[75] Inventors: Thomas J. Pullukat, Hoffman Estates; Mitsuzo Shida, Barrington; Raymond E. Hoff, Palatine, all of Ill.

[73] Assignee: Chemplex Company, Rolling Meadows, Ill.

[21] Appl. No.: 915,056

[22] Filed: Jun. 12, 1978

Related U.S. Application Data

[63] Continuation-in-part of Ser. No. 764,914, Feb. 2, 1977, abandoned.

[51] Int. Cl.$^2$ .................... C08F 4/02; B01J 31/14; B01J 21/02; B01J 23/36
[52] U.S. Cl. .................... 252/430; 252/428; 252/432; 252/433; 526/96; 526/131
[58] Field of Search ............... 252/428, 430, 432, 433; 526/96

[56] References Cited

U.S. PATENT DOCUMENTS

| | | | |
|---|---|---|---|
| 2,810,774 | 10/1957 | Serniuk | 252/433 |
| 3,294,860 | 12/1966 | Loft et al. | 252/430 |
| 3,515,705 | 1/1970 | Balitrand | 252/428 |
| 3,694,422 | 9/1972 | Long | 252/430 |
| 3,780,011 | 12/1973 | Pullukat et al. | 526/96 |
| 3,884,832 | 5/1975 | Pullukat et al. | 252/430 |
| 3,953,413 | 4/1976 | Hwang et al. | 526/96 |
| 4,003,978 | 1/1977 | Shiroishi et al. | 252/432 |

*Primary Examiner*—P. E. Konopka
*Attorney, Agent, or Firm*—Wegner, Stellman, McCord, Wiles & Wood

[57] ABSTRACT

A highly active catalyst for polymerizing ethylene to polyethylene and copolymers of ethylene with alpha-olefins having a narrow molecular weight distribution, a method of making the catalyst and a method of polymerizing in which the catalyst is prepared by forming a mixture of a porous support of silica, alumina, zirconia, thoria or mixtures and a chromium compound and an alkyl ester of boron containing 1–7 carbon atoms in the alkyl group or a halide of boron capable of reacting with the chromium compound and activating this mixture at an elevated temperature in a fluidized bed with a substantially dry reducing gas followed by fluidizing with an oxidizing gas at an elevated temperature.

26 Claims, No Drawings

ETHYLENE POLYMERIZATION CATALYST AND METHOD

CROSS-REFERENCE TO RELATED APPLICATION

This application is a continuation-in-part of our copending application Ser. No. 764,914, filed Feb. 2, 1977, now abandoned.

BACKGROUND OF THE INVENTION

In prior U.S. Pat. No. 3,780,011, assigned to the assignee hereof, there is described and claimed a catalyst and method in which the catalyst is prepared by treating a mixture of a support such as silica and chromium trioxide with an ester of titanium, boron or vanadium or mixtures while fluidizing the resulting bed, followed by activating the bed with a dry gas that contains oxygen at elevated temperatures. This catalyst is useful in producing polyolefins and particularly polyethylene with controllable viscoelastic properties. When the ester is boron the activity in ethylene polymerization is satisfactory but preferably should be higher and the polyethylene has narrow molecular weight distribution. In the present invention the catalyst which contains boron as well as chromium has greatly increased activity while still producing polyethylene having a narrow molecular weight distribution.

DESCRIPTION OF THE PREFERRED EMBODIMENTS

In this invention the porous support is either silica, alumina, zirconia, thoria, magnesia or mixtures thereof. This support is mixed with a chromium compound such as chromium trioxide, chromic nitrate, ammonium chromate or an organochromate such as chromium acetylacetonate, chromium carboxylate, Chromocene, etc. that is reactive with the boron ester that is added later. The chromium level in the support can be from 0.1% to 10%. Levels outside this range can also be used if desired.

Then the mixture is preferably heated by fluidizing the resulting bed with a gas that is inert to the bed and its ingredients while heating at an elevated temperature. Then an alkyl ester of boron containing about 1–7 carbon atoms in the alkyl group or a halide of boron is added to the chromium containing bed with the two ingredients being present in an amount to give about 0.1–10 wt.% of boron. Then the bed is activated at an elevated temperature by fluidizing the bed with a substantially dry reducing gas and finally fluidizing with an oxidizing gas at an elevated temperature.

Under these conditions the boron ester reacts with the chromium compound to form a chromium-boron compound and under the heating and with the reducing gas at a higher temperature a boron-chromium support (e.g. silica) compound. The final treatment with an oxidizing gas such as air at an elevated temperature is for a very short time to oxidize the ingredients of the bed after which the bed is cooled down in an inert atmosphere. The catalyst thusly prepared is active in ethylene polymerization to produce polyethylene of narrow molecular weight distribution and the activity of such a catalyst is greatly increased over the same catalyst without the modification and the activation of this invention.

The temperature of activating and of the final oxidizing step is above 250° C. and preferably between about 600°–900° C. with a practical range being about 400°–800° C. The total time for activating and then oxidizing is preferably from about 1 minute to as much as 48 hours.

After being activated, the catalyst may be used immediately in a polymerization process or can be stored under substantially anhydrous conditions until desired for use. The polymerization process is simply that of contacting the monomer or mixture of monomers with an effective catalytic amount of the catalyst in the presence or the absence of diluents or solvents which are known to be suitable. The polymerization process may be under known conditions of temperature, pressure or the like. The polymerization may be conducted in the presence of a hydrocarbon which is liquid under the reaction conditions and which acts as a diluent and not a solvent for polyethylene under the reaction conditions employed. Preferred hydrocarbon diluents are paraffins including cycloparaffins and particularly paraffins and cycloparaffins having 3–12 carbon atoms. Illustrative of diluents are propane, isobutane, n-pentane, isopentane, neopentane, 2,2,4-trimethylpentane, cyclohexane and methylcyclohexane.

The thusly produced catalyst may be used to catalyze the polymerization of ethylene alone or mixtures of ethylene with alpha-olefins at the customary temperatures of, for example, about 30° C. or less up to about 200° C. or more. It was found that this catalyst has a special increased tendency to incorporate alpha-olefins into polyethylene in copolymerization tests with ethylene and alpha-olefins.

In the preferred process the bed containing the chromium compound is heated before adding the boron ester as by heating in a fluidized bed with a gas at a temperature of about 100° C. The boron ester is then added as specified and this may be any of the alkyl borates coming within the designated group of which isopropylborate, trimethylborate and the like are examples.

The reducing gas which is used in the activating step prior to the final oxidizing can conveniently be a mixture of nitrogen and carbon monoxide containing at least 0.1 wt.% carbon monoxide.

As noted, the polymerization of the ethylene or mixtures of ethylene with alpha-olefins, preferably of 2–8 carbon atoms, with the highly active catalyst of this invention can be in a particle form process, solution process or can be a gas phase process. The activity of this catalyst is greater than catalysts containing boron prepared according to the above U.S. Pat. No. 3,780,011. The resulting polyethylene which has narrow molecular weight distribution and lower elasticity is useful in making film, thermoforming objects and the like.

The following examples are illustrative of the invention with Example 1 being a control in which the catalyst is prepared according to the above U.S. Pat. No. 3,780,011.

EXAMPLE 1

(Control)

In this control example the catalyst was prepared by forming a mixture of silica, chromium trioxide and isopropylborate in an amount to give 2% boron and 1% chromium. This mixture was then activated in air at about 610° C. for about 5 hours. This catalyst which is similar to that disclosed in the boron containing catalyst of the above U.S. Pat. No. 3,780,011 when used to polymerize ethylene at 550 psig using isobutane as a diluent and a reaction temperature of 105° C. resulted in polyethylene at a reactivity of 1094 g/g cat/hr.

EXAMPLE 2

In the following examples that are according to the present invention the same boron ester was used and the same chromium trioxide also on silica and in amounts to give 1.5% boron and 1% chromium in the resulting bed. This mixture was activated by fluidizing with a reducing gas comprising 7% carbon monoxide and 93% nitrogen for 5 hours at 610° C. At the end of this period the reducing gas was discontinued and air was introduced at this same 610° C. for 30 minutes. At the conclusion of this period the air flow was terminated and nitrogen was introduced and the catalyst was cooled with nitrogen. Under the same polymerizing conditions of Example 1 the catalyst of this invention had a reactivity of 1788 g/g cat/hr.

EXAMPLE 3

In this example a catalyst was prepared under the conditions of Example 2 but containing 2% boron and 1% chromium on the silica. This mixture was also activated in a fluidized bed using a reducing gas comprising 7% carbon monoxide and 93% nitrogen at 620° C. for 5 hours. At the end of this time the reducing gas was discontinued and air was introduced at this same temperature for an additional 30 minutes. Then the air flow was discontinued, nitrogen introduced and the catalyst cooled. Under the same polymerizing conditions, that is at a reaction temperature of 105° C., the reactivity of this example was 1908 g/g cat/hr.

EXAMPLE 4

8 Grams of Davison grade 952 silica was blended with chromium acetylacetonate to give 1% chromium on the support. It was placed in a fluid bed activator and heated in a current of air (300 cc/min.) for 0.5 hour at 120° C. It was further heated to 370° C. for two hours, cooled down to 100° C. and treated with trimethylborate to give 1% boron on the silica support. The resulting product was activated in a fluidized bed using a reducing gas comprising 7% carbon monoxide and 93% nitrogen at 600° C. for 5 hours. At the end of this time, the reducing gas flow was discontinued and air was introduced at this temperature for an additional 15 minutes. This air flow was discontinued and nitrogen introduced and the catalyst cooled. This catalyst under this same polymerizing condition, that is at a reaction temperature of 105° C., showed a reactivity of 1715 g/g cat/hr.

EXAMPLE 5

In this example, the mixture of silica and chromium acetylacetonate was heated in a fluidized bed at 150° C. for 45 minutes in an air flow. It was cooled to 60° C. and treated with trimethylborate to give 1% boron. The resulting product was activated as in Example 4. Ethylene polymerization using this catalyst gave a reactivity of 1505 g/g cat/hr.

EXAMPLE 6

A mixture of silica (Davison grade 952) and chromium trioxide (1% chromium) was heated in a fluidized bed at 175° C. in nitrogen. It was treated with trimethylborate to give 0.5% boron on the final catalyst at 175° C. The resulting product was activated in 7% carbon monoxide-93% nitrogen mixture for 5 hours at 700° C. At the end of this time, the reducing gas flow was turned off and air was introduced at 700° C. for one hour. The air flow was turned off and nitrogen introduced and the catalyst was cooled. Ethylene was copolymerized with hexene-1 using this catalyst at 96° C. The polymer made had a density of 0.935.

Having described our invention as related to the embodiments set out herein, it is our intention that the invention be not limited by any of the details of description, unless otherwise specified, but rather be construed broadly within its spirit and scope as set out in the appended claims.

We claim:

1. A highly active catalyst for polymerizing ethylene to polyethylene or to copolymers of ethylene with alpha-olefins having a narrow molecular weight distribution, prepared by: forming a mixture of (1) a porous support of the class consisting of silica, alumina, zirconia, thoria and mixtures thereof, (2) a chromium compound and (3) an alkyl ester of boron containing 1 to about 7 carbon atoms in the alkyl group or a halide of boron, said (2) being reactive with (3) to form a chromium-boron compound upon heating, said mixture containing about 0.1-10 wt.% of boron and about 0.1-10 wt.% of chromium and (4) activating said mixture at an elevated temperature in a fluidized bed with a substantially dry reducing gas and then fluidizing (4) with (5) an oxidizing gas at an elevated temperature.

2. The catalyst of claim 1 wherein (1) comprises silica.

3. The catalyst of claim 1 wherein (2) is a member of the class consisting of chromium trioxide, chromic nitrate, ammonium chromate and organochromates reactive with said boron ester.

4. The catalyst of claim 1 wherein said mixture of (1) and (2) is dried in a fluidized bed with a gas at a drying temperature prior to the addition of (3).

5. The catalyst of claim 1 wherein said gas of (4) comprises a mixture of nitrogen and carbon monoxide.

6. The catalyst of claim 1 wherein (2) is chromium acetylacetonate.

7. The catalyst of claim 5 wherein (4) contains at least 1 wt.% of carbon monoxide.

8. The catalyst of claim 1 wherein said elevated activation temperature of (4) is about 600°-900° C.

9. The catalyst of claim 1 wherein (5) comprises air followed by (6) cooling said mixture in an atmosphere of an inert gas.

10. The catalyst of claim 9 wherein said inert gas comprises nitrogen.

11. The catalyst of claim 1 wherein (1) comprises silica, (2) is a member of the class consisting of chromium trioxide, chromic nitrate, ammonium chromate and organochromates reactive with said boron ester and said elevated temperature of (4) is about 600°-900° C.

12. The catalyst of claim 11 wherein said mixture of (1) and (2) is dried in a fluidized bed with a gas at a drying temperature prior to the addition of (3).

13. The catalyst of claim 11 wherein (5) comprises air followed by (6) cooling said mixture in an atmosphere of an inert gas.

14. The method of making a highly active catalyst for polymerizing ethylene to polyethylene or to copolymers of ethylene with alpha-olefins having a narrow molecular weight distribution, comprising: forming a mixture of (1) a porous support of the class consisting of silica, alumina, zirconia, thoria and mixtures thereof, (2) a chromium compound and (3) an alkyl ester of boron containing 1 to about 7 carbon atoms in the alkyl group or a halide of boron, said (2) being reactive with (3) to form a chromium-boron compound upon heating, said mixture containing about 0.1–10 wt.% of boron and about 0.1–10 wt.% of chromium, and (4) activating said mixture at an elevated temperature in a fluidized bed with a substantially dry reducing gas and then fluidizing (4) with (5) an oxidizing gas at an elevated temperature.

15. The method of claim 14 wherein (1) comprises silica.

16. The method of claim 14 wherein (2) is a member of the class consisting of chromium trioxide, chromic nitrate, ammonium chromate and organochromates reactive with said boron ester.

17. The method of claim 14 wherein said mixture of (1) and (2) is dried in a fluidized bed with a gas at a drying temperature prior to the addition of (3).

18. The method of claim 14 wherein said gas of (4) comprises a mixture of nitrogen and carbon monoxide.

19. The method of claim 14 wherein (2) is chromium acetylacetonate.

20. The method of claim 18 wherein (4) contains at least about 1 wt.% of carbon monoxide and the remainder an inert gas.

21. The method of claim 14 wherein said elevated activation temperature of (4) is about 600°–900° C.

22. The method of claim 14 wherein (5) comprises air followed by (6) cooling said mixture in an atmosphere of an inert gas.

23. The method of claim 22 wherein said inert gas comprises nitrogen.

24. The method of claim 14 wherein (1) comprises silica, (2) is a member of the class consisting of chromium trioxide, chromic nitrate, ammonium chromate and organochromates reactive with said boron ester and said elevated temperature of (4) is about 600°–900° C.

25. The method of claim 24 wherein said mixture of (1) and (2) is dried in a fluidized bed with a gas at a drying temperature prior to the addition of (3).

26. The method of claim 24 wherein (5) comprises air followed by (6) cooling said mixture in an atmosphere of an inert gas.

* * * * *